(12) United States Patent
Smith (10) Patent No.: US 8,562,011 B1
(45) Date of Patent: Oct. 22, 2013

(54) UTILITY TRAILER

(76) Inventor: Charles D. Smith, Indianapolis, IN (US)

( * ) Notice: Subject to any disclaimer, the term of this patent is extended or adjusted under 35 U.S.C. 154(b) by 477 days.

(21) Appl. No.: 12/948,220

(22) Filed: Nov. 17, 2010

(51) Int. Cl.
*B62D 53/00* (2006.01)

(52) U.S. Cl.
USPC .......................................... 280/400; 296/156

(58) Field of Classification Search
USPC ........................... 296/156, 168, 24.3; 280/400
See application file for complete search history.

(56) References Cited

U.S. PATENT DOCUMENTS

| | | | | |
|---|---|---|---|---|
| 3,917,086 A * | 11/1975 | Sexton | ............................ | 414/534 |
| 4,133,572 A * | 1/1979 | Robbins et al. | ............... | 296/168 |
| 4,162,735 A | 7/1979 | Lewis | | |
| 4,253,791 A | 3/1981 | Van Drie | | |
| 4,277,095 A * | 7/1981 | Barruw | ......................... | 296/24.3 |
| 4,425,069 A | 1/1984 | Saur et al. | | |
| 4,518,303 A | 5/1985 | Moser | | |
| 4,701,086 A * | 10/1987 | Thorndyke | ..................... | 410/26 |
| 4,992,013 A | 2/1991 | Westerdale | | |
| 5,314,200 A * | 5/1994 | Phillips | .......................... | 280/400 |
| 6,135,526 A * | 10/2000 | Reckner, Jr. | ................ | 296/37.13 |
| 6,299,229 B1 * | 10/2001 | Becenas Nieto | ............. | 296/24.3 |
| 6,601,894 B2 * | 8/2003 | Shaw | ........................... | 296/24.3 |
| 6,729,678 B1 * | 5/2004 | Atcravi | ......................... | 296/168 |
| 6,817,653 B2 * | 11/2004 | Ropp | .......................... | 296/186.2 |
| 6,840,529 B2 * | 1/2005 | Call | ............................. | 280/403 |
| 7,004,525 B1 * | 2/2006 | Turnbow | ...................... | 296/24.31 |
| 7,114,754 B2 * | 10/2006 | Morello | ...................... | 296/24.32 |
| 7,618,085 B1 * | 11/2009 | Bean | ............................. | 296/157 |
| 2004/0140065 A1 * | 7/2004 | Hartmann | ..................... | 160/201 |
| 2007/0044359 A1 * | 3/2007 | Worley | ......................... | 40/590 |
| 2007/0256797 A1 * | 11/2007 | Orton et al. | ................... | 160/188 |
| 2011/0313811 A1 * | 12/2011 | Urban et al. | ................. | 705/7.25 |
| 2012/0267057 A1 * | 10/2012 | Rydberg | ....................... | 160/113 |

* cited by examiner

Primary Examiner — Tashiana Adams (57) ABSTRACT

A utility trailer that includes a main compartment, an aft compartment, a hitch and jack assembly to attach it to a vehicle, and a number of components that will assist an individual in both shredding brush and branches as needed and also removing the resulting residue quickly and easily with use of various control boxes attached to the utility trailer. The trailer also includes a top-mounted shoot opening for throwing brush and debris into the utility trailer and conveyor belt system located within the main compartment for moving debris within the main compartment onto a pulled-out debris tray. A fold-down interior door is located within the main compartment and usually covers the conveyor belt system. Furthermore, a debris pusher blade is also located within the main compartment and can be utilized to push debris out of the main compartment by attached controls.

14 Claims, 9 Drawing Sheets

UTILITY TRAILER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved utility trailer that includes a main compartment, an aft compartment, a hitch and jack assembly to attach it to a vehicle, and a number of components that will assist an individual in both shredding brush and branches as needed and also removing the resulting residue quickly and easily with use of various control boxes attached to the utility trailer.

SUMMARY OF THE INVENTION

The present invention concerns that of a new and improved utility trailer that includes a main compartment, an aft compartment, a hitch and jack assembly to attach it to a vehicle, and a number of components that will assist an individual in both shredding brush and branches as needed and also removing the resulting residue quickly and easily with use of various control boxes attached to the utility trailer. The trailer also includes a top-mounted shoot opening for throwing brush and debris into the utility trailer and conveyor belt system located within the main compartment for moving debris within the main compartment onto a pulled-out debris tray. A fold-down interior door is located within the main compartment and usually covers the conveyor belt system. Furthermore, a debris pusher blade is also located within the main compartment and can be utilized to push debris out of the main compartment by attached controls.

There has thus been outlined, rather broadly, the more important features of a utility trailer that the detailed description thereof that follows may be better understood and in order that the present contribution to the art may be better appreciated. There are, of course, additional features of the utility trailer that will be described hereinafter and which will form the subject matter of the claims appended hereto.

In this respect, before explaining at least one embodiment of the utility trailer in detail, it is to be understood that the utility trailer is not limited in its application to the details of construction and to the arrangements of the components set forth in the following description or illustrated in the drawings. The utility trailer is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present utility trailer. It is important, therefore, that the claims be regarded as including such equivalent constructions insofar as they do not depart from the spirit and scope of the present invention.

It is therefore an object of the present invention to provide a utility trailer which has all of the advantages of the prior art and none of the disadvantages.

It is another object of the present invention to provide a utility trailer which may be easily and efficiently manufactured and marketed.

It is another object of the present invention to provide a utility trailer which is of durable and reliable construction.

It is yet another object of the present invention to provide a utility trailer which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
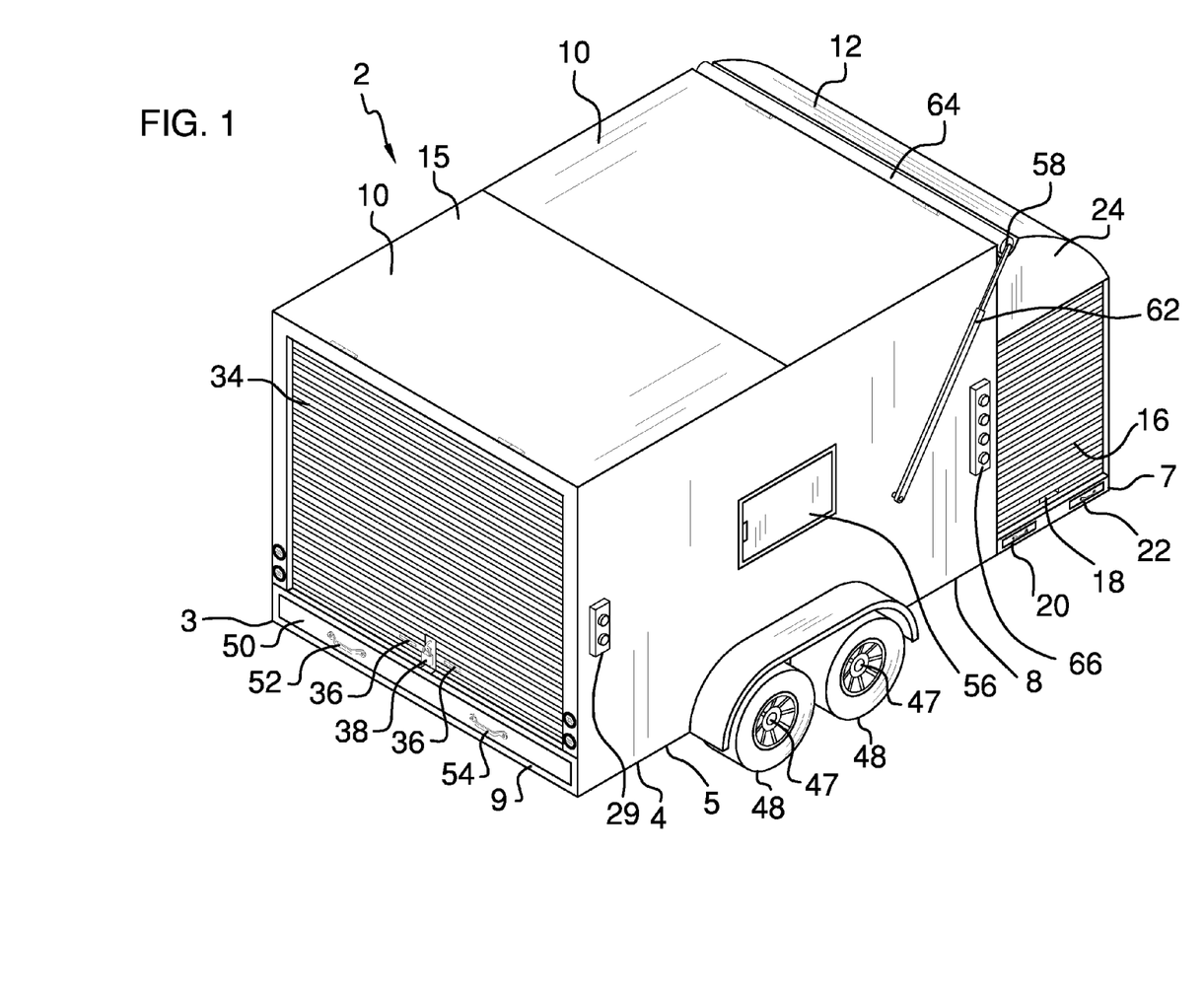
FIG. 1 shows an upper rear perspective view of the utility trailer.
Figure 2:
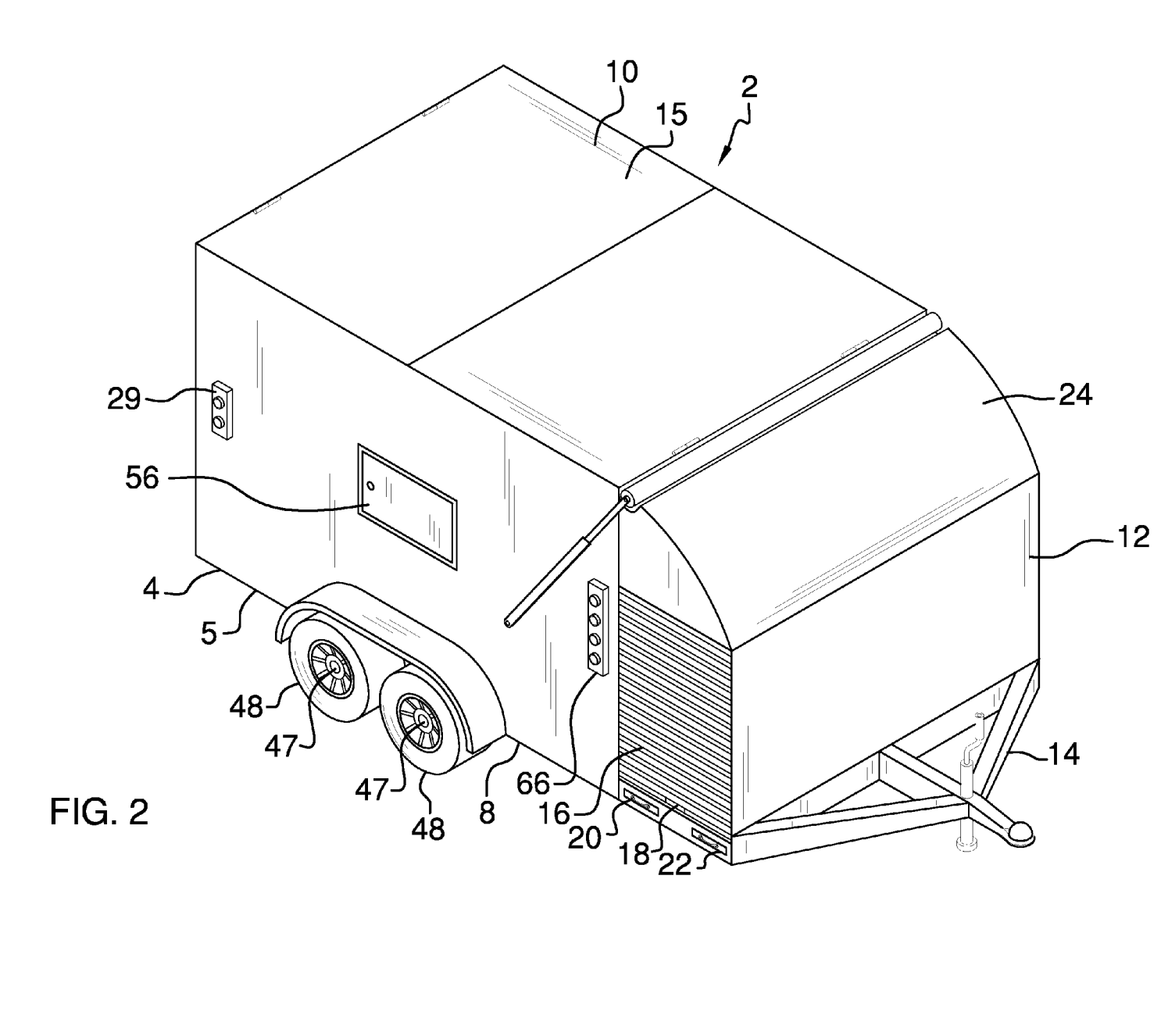
FIG. 2 shows an upper front perspective view of the utility trailer.
Figure 3:
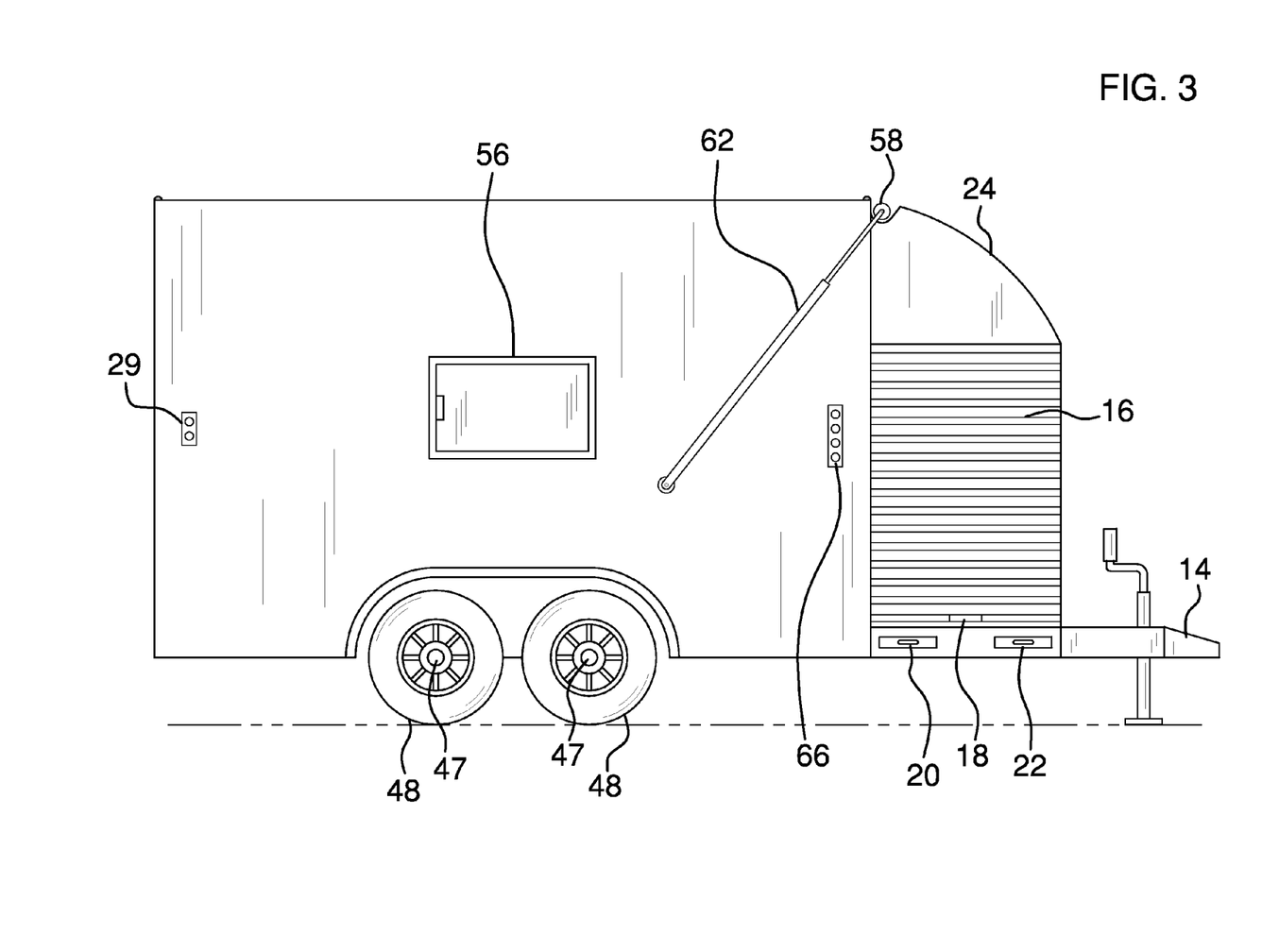
FIG. 3 shows a side view of the utility trailer.
Figure 4:
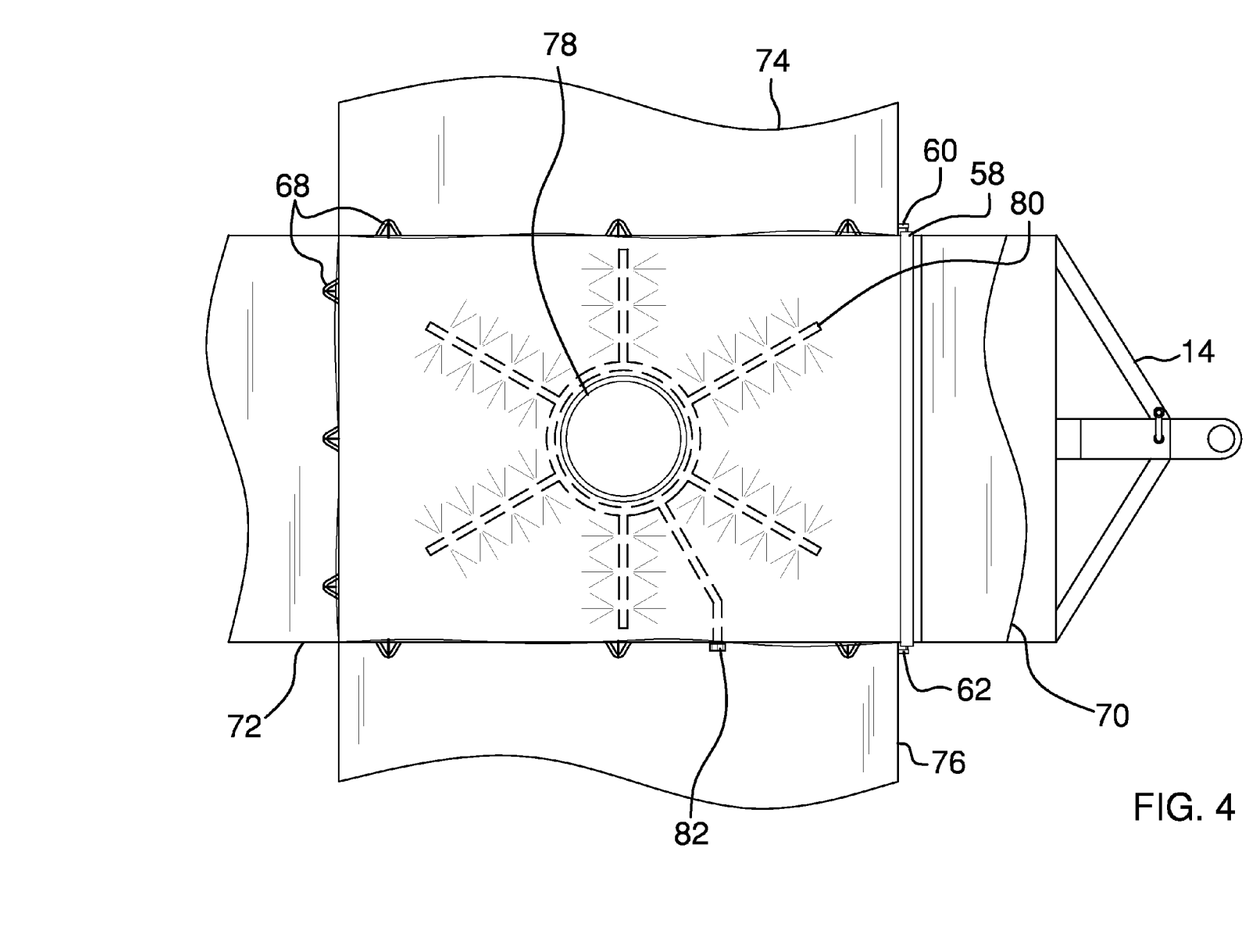
FIG. 4 shows a top view of the utility trailer.
Figure 5:
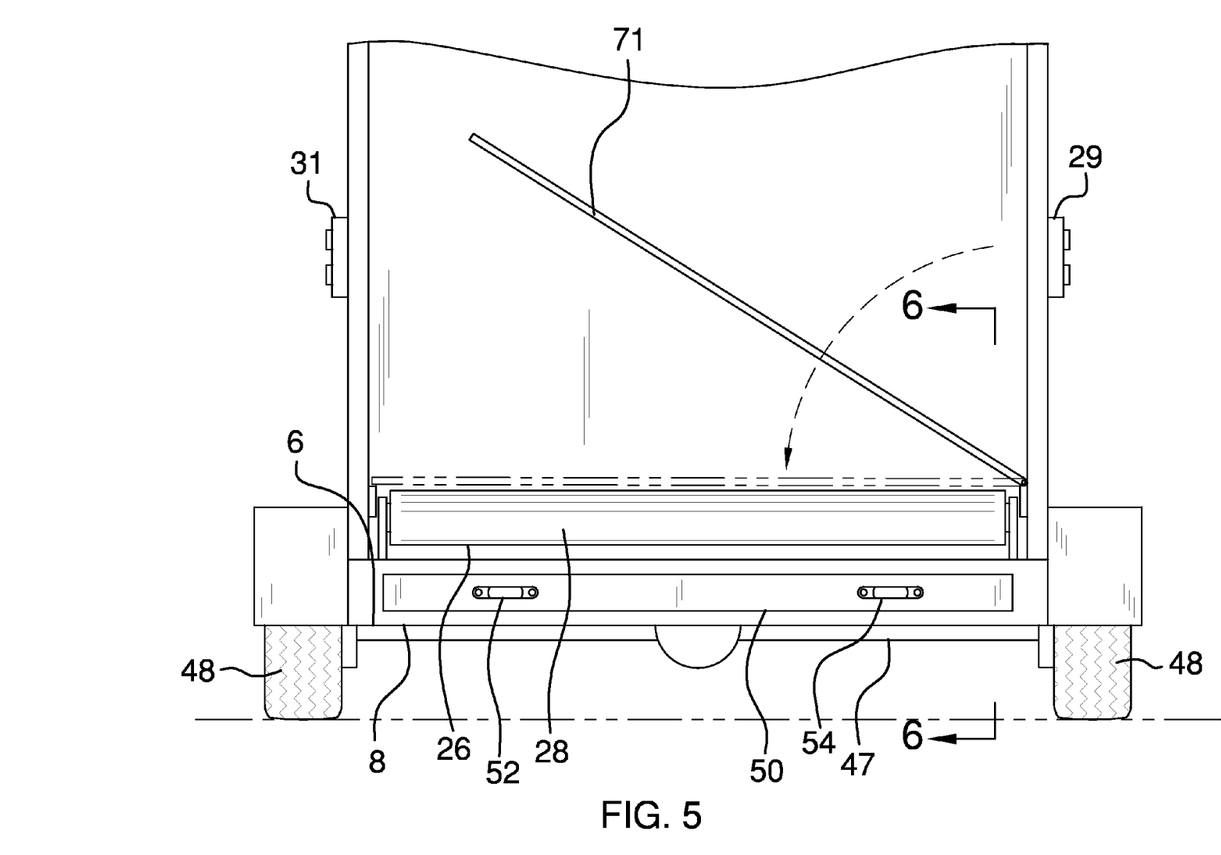
FIG. 5 shows a rear view of the utility trailer.
Figure 6:
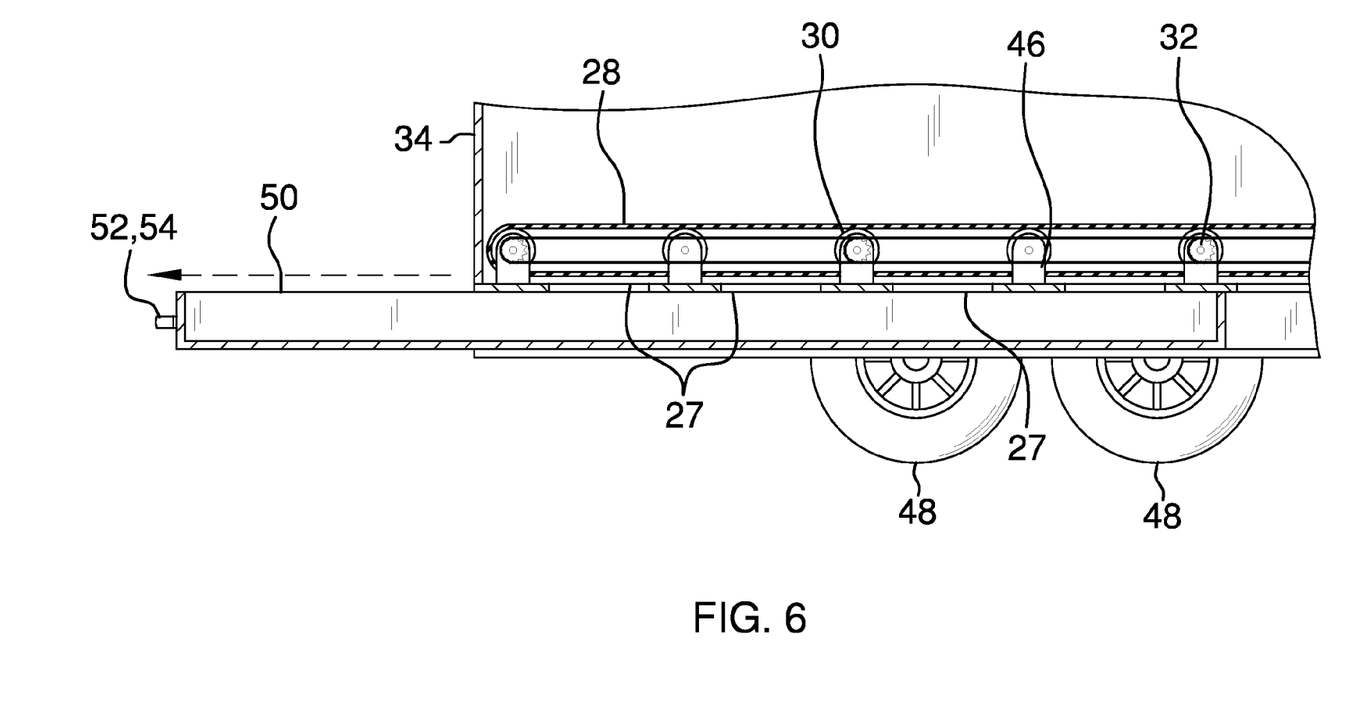
FIG. 6 shows a side view of the utility trailer highlighting the pull-out debris tray and the conveyor belt system.
Figure 7:
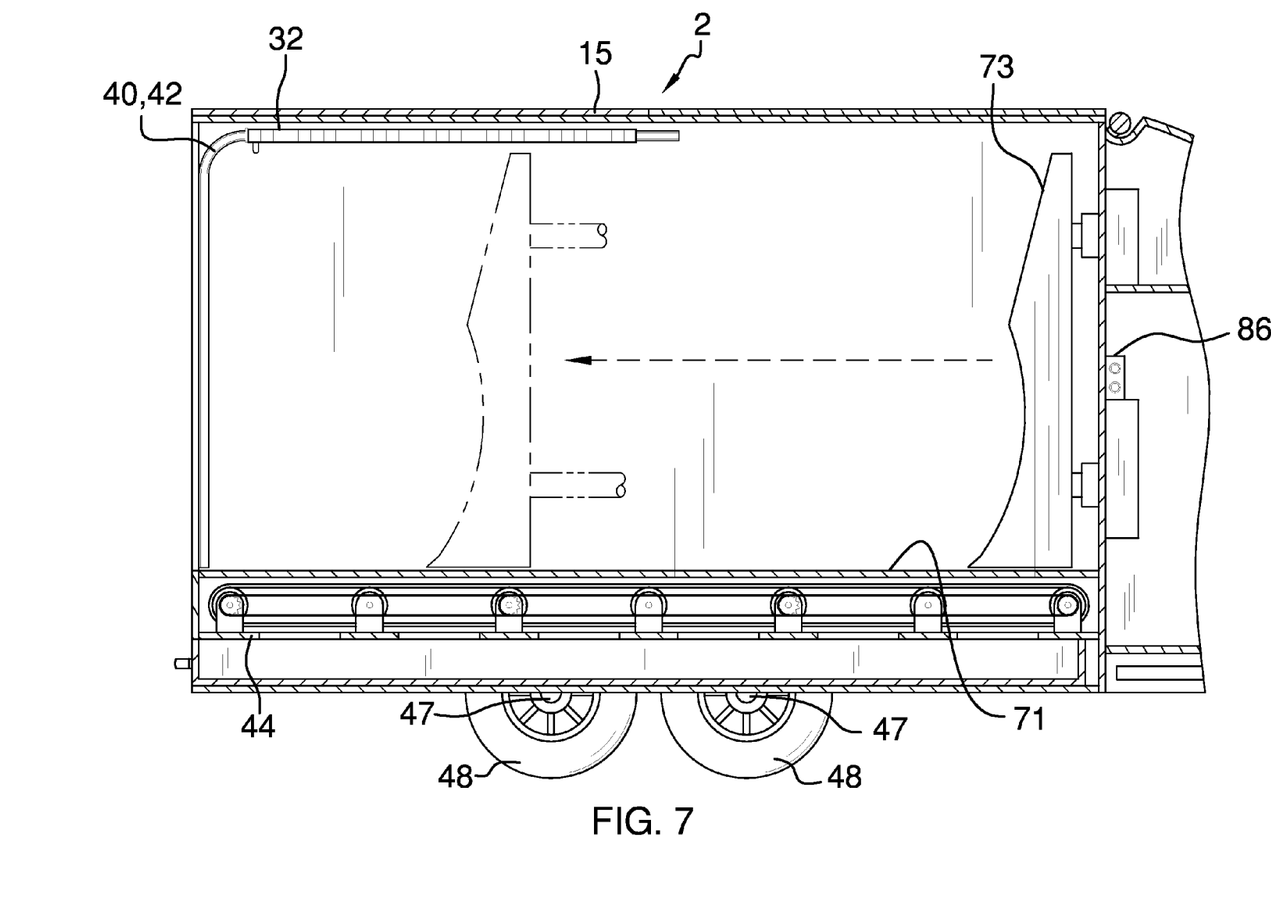
FIG. 7 shows a side cutaway view of the conveyor belt system and the debris pusher blade within the utility trailer.
Figure 8:
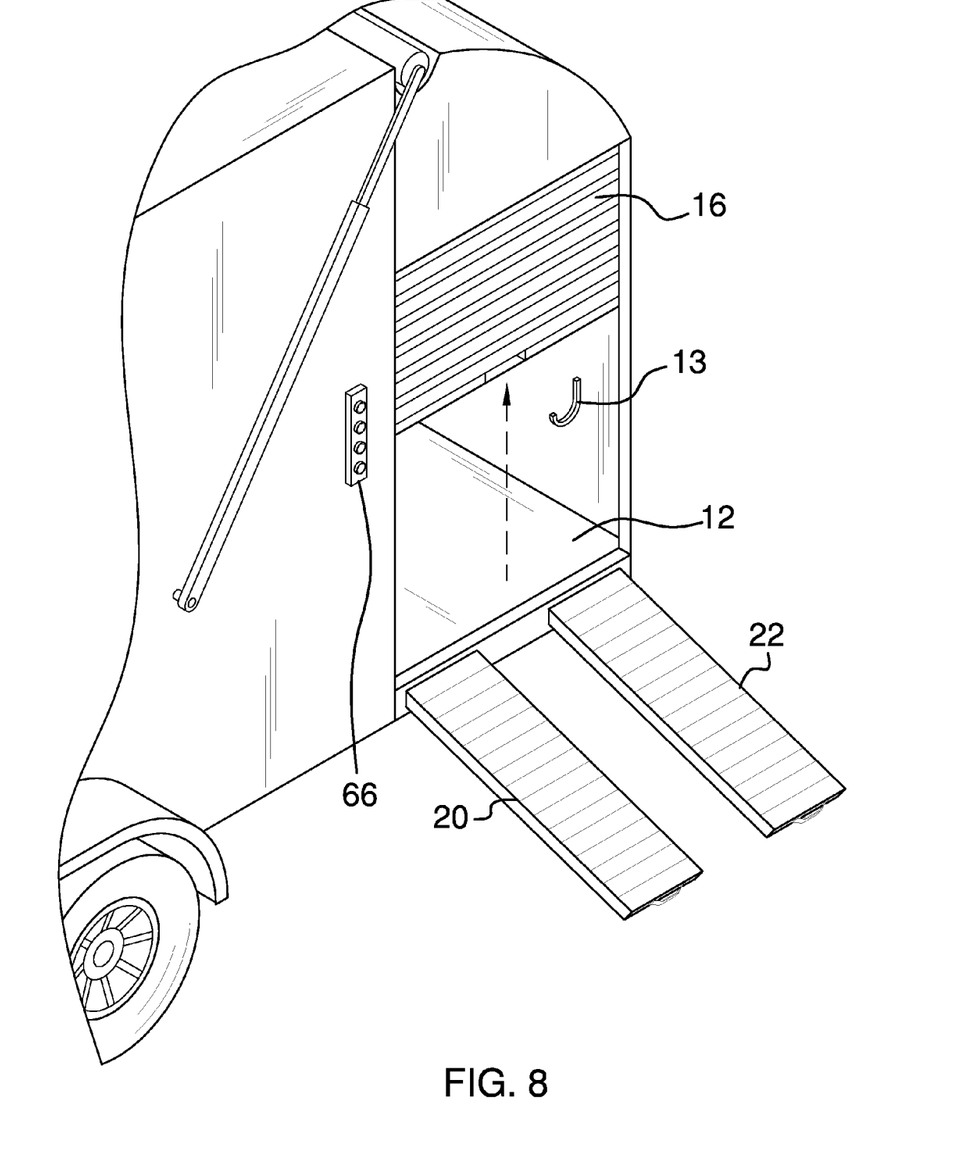
FIG. 8 shows a side perspective view of the aft compartment within the utility trailer.
Figure 9:
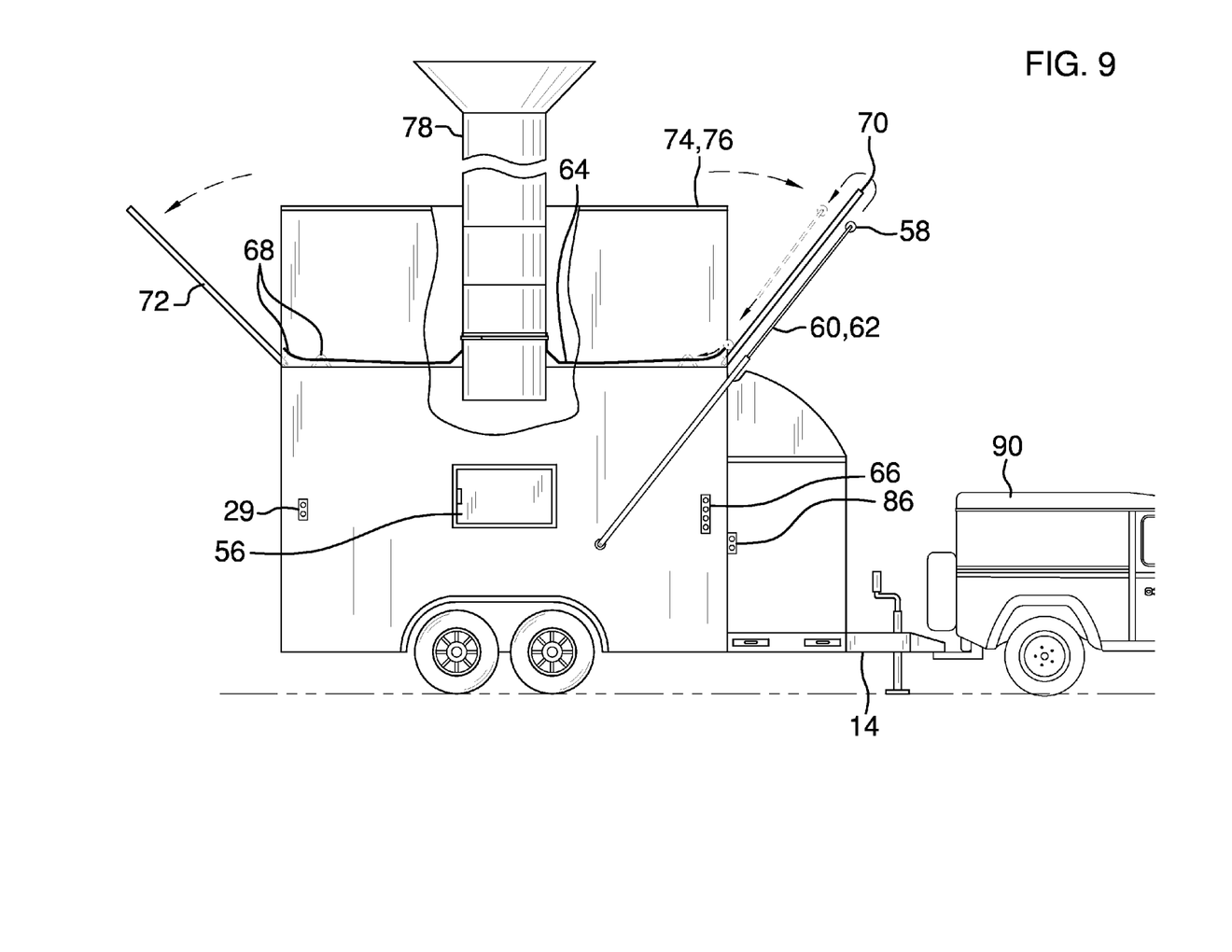
FIG. 9 shows a side view of the utility trailer, highlighting the debris shoot and the external top doors attached to the utility trailer.

With reference now to the drawings, and in particular to FIGS. 1 through 9 thereof, a new utility trailer embodying the principles and concepts of the present invention and generally designated by the reference numeral 2 will be described.

As best illustrated in FIGS. 1 through 9, the preferred embodiment of the utility trailer 2 comprises a trailer unit 15 that has a base 4, with the base 4 having two surfaces comprising an upper surface 6 and a lower surface 8. The base 4 also has two sides comprising a left side 3 and a right side 5 and two ends comprising a front end 7 and a rear end 9. The base is mounted on a plurality of axles 47, with each axle 47 being attached to a pair of wheels 48.

The trailer unit 15 is broken down into two separate compartments comprising a main compartment 10 and an aft compartment 12, each of which are attached to the base 4. The aft compartment 12 is located closer to the front end 7 of the base 4 than the main compartment 10.

The main compartment 10 has a roll-up rear door 34 that is mounted on a pair of tracks 40 and 42, which are each located within the main compartment 10. The door 34 has a handle 36 allowing an individual to easily control the door 34 to either open or shut it, and furthermore, has a padlock 38 allowing the door 34 to be secured when in a closed position.

The aft compartment 12 has a roll-up side door 16 that can be opened or closed with a handle 18. The door 16 is located just above the right side 5 of the base 4. Within the aft compartment 12 are located a plurality of hooks 13 to hang items as needed. Immediately below the door 16 are a pair of ramps 20 and 22, which are located within the base 4 and can be used by an individual for easier ingress and egress into the aft compartment 12. On top of the aft compartment 12 is located a wind deflector bubble 24, which helps to minimize wind resistance when the utility trailer 2 is traveling.

The utility trailer 2 also has a hitch and jack assembly 14, which allows the utility trailer 2 to be attached to a vehicle 90. The hitch and jack assembly 14 is attached to the front end 7 of the base 4 and can be used to attach the utility trailer 2 to a vehicle 90.

A pair of telescoping rods 60 and 62 are attached to the main compartment 10 and also are attached to a tarp roll 58, which has a tarp 64 wound around it. The tarp 64 can be pulled over the top of the main compartment 10 and fastened to a plurality of tarp tie downs 68, which are attached to the main compartment 10.

A trash door 56 is also located on the main compartment 10, allowing an individual to throw debris into the main compartment 10 from an exterior location by merely opening the trash door 56.

An interior floor 44 is located within the main compartment 10. The main compartment 10 has a plurality of debris openings 27 at the level of the interior floor 44 to allow debris to exit the main compartment 10 independent. In addition, in between the interior floor 44 and the upper surface 6 of the base 4, a pullout debris tray 50 is located, which can be handled by utilizing a pair of handles 52 and 54.

A conveyor system 26 is located on top of the interior floor 44 within the main compartment 10, with the conveyor system 26 including a plurality of conveyor rollers 30 mounted on a plurality of mounts 46, with one roller 30 being located on each mount 46. A conveyor belt 28 is attached to each of the conveyor rollers 30 and a conveyor drive 32 is attached to the conveyor belt 28 to move the belt 28 in a direction toward the rear end 7 of the main compartment. A pair of conveyor control boxes 29 and 31 are located on the outside of the main compartment 10 and allow an individual to control the conveyor system 26 via the conveyor drive 32.

The main compartment 10 also has a foldable interior door 71 controllable by interior door controls 86 mounted on the utility trailer 2. When the interior door 71 is in the down position, it rests above the conveyor system 26. Also, a debris pusher blade 73 is located within the main compartment and can be controlled by a set of debris pusher controls 66 attached to the outside of the main compartment 10. The debris pusher blade 73 is designed to move toward the rear end 9 of the base 4, moving any debris out of the main compartment. The debris pusher blade 73 is located above the foldable interior door 71 when the foldable interior door 71 is in a lowered position.

The main compartment 10 has a plurality of top doors comprising a front top door 70, a rear top door 72, a left top door 74, and a right top door 76. Each of the top doors is attached to the main compartment and provide extra roof cover. Furthermore, the main compartment 10 includes a shoot opening 78 which extends from the outside of the main compartment 10.

The main compartment also includes a plurality of lengths of embedded hose 80, with each length of embedded hose 80 being connected to at least one other length of embedded hose 80. Each length of embedded hose 80 is embedded within the main compartment 10. At least one external hose connection 82 is connected to one of the lengths of embedded hose 80. The lengths of hose 80 are designed to spray water when utilized.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A utility trailer comprising
a trailer unit, the trailer unit comprising a base, the base having two surfaces comprising an upper surface and a lower surface, the base also having two sides comprising a left side and a right side, the base also having ends comprising a front end and a rear end,
means for mounting the base,
means for attaching the utility trailer to a vehicle,
wherein the means for mounting the base further comprises
a plurality of axles,
a plurality of wheels, wherein each axle is connected to two wheels,
wherein the base is mounted on each axle of the plurality of axles,
wherein the trailer unit further comprises
a main compartment attached to the base,
an aft compartment attached to the base,
wherein the aft compartment is located closer to the front end of the base than the location of the main compartment,
wherein the main compartment further comprises
a rear door,
means for mounting the rear door,
a handle attached to the rear door,
a padlock attached to the rear door,
wherein the means for mounting the rear door further comprises
a pair of tracks comprising a first track and a second track,
wherein each of the tracks are located within the main compartment,
wherein the aft compartment further comprises
a roll-up door,
a handle attached to the roll-up door,
at least one hook located within the aft compartment,
means for allowing an individual to more easily enter and leave the aft compartment,
wherein the means for allowing an individual to more easily enter and leave the aft compartment further comprises
a pair of ramps comprising a first ramp and a second ramp,
wherein each of the ramps are located within the base,
wherein each of the ramps can be pulled out of the base when needed.

2. A utility trailer according to claim 1 wherein the utility trailer further comprises
a wind deflector bubble, wherein the wind deflector bubble is located on the aft compartment.

3. A utility trailer according to claim 2 wherein the means for attaching the utility trailer to a vehicle further comprises
a hitch and jack assembly,
wherein the hitch and jack assembly is attached to the front end of the base,
further wherein the hitch and jack assembly can be attached to a vehicle.

4. A utility trailer according to claim 3 wherein the utility trailer further comprises
a pair of telescoping rods comprising a first telescoping rod and a second telescoping rod, wherein each of the telescoping rods is attached to the main compartment,
a tarp roll attached to each of the telescoping rods of the pair of telescoping rods,
a tarp attached to the tarp roll, wherein the tarp can be pulled over the main compartment, and
means for fastening the tarp to the main compartment.

5. A utility trailer according to claim 4 wherein the means for fastening the tarp to the main compartment further comprises
a plurality of tie downs,
wherein each of the tie downs of the plurality of tie downs are attached to the main compartment.

6. A utility trailer according to claim 5 wherein the utility trailer further comprises a trash door, wherein the trash door is attached to the main compartment.

7. A utility trailer according to claim 6 wherein the utility trailer further comprises
an interior floor located within the main compartment,
a pullout debris tray located within the main compartment in between the interior floor and the upper surface of the base, and
a pair of handles comprising a first handle and a second handle, wherein the pair of handles are attached to the pullout debris tray.

8. A utility trailer according to claim 7 wherein the utility trailer further comprises a conveyor system, wherein the conveyor system further comprises
a plurality of mounts located within the main compartment,
a plurality of rollers, wherein each roller of the plurality of rollers is attached to a mount of the plurality of mounts,
a conveyor belt, wherein the conveyor belt is attached to each of the rollers of the plurality of rollers,
a conveyor drive attached to the conveyor belt, wherein the conveyor drive moves the belt in a direction toward the rear end of the main compartment, and
means for controlling the conveyor drive.

9. A utility trailer according to claim 8 wherein the means for controlling the conveyor drive further comprises
a pair of conveyor control boxes comprising a first conveyor control box and a second conveyor control box,
wherein each of the conveyor control boxes is located on the main compartment.

10. A utility trailer according to claim 9 wherein the utility trailer further comprises means for moving debris out of the main compartment, said means further comprising
a foldable interior door located within the main compartment,
means for controlling the foldable interior door, said means further comprising a set of interior door controls, wherein the set of interior door controls is attached to the utility trailer,
a debris pusher blade located within the main compartment, the debris pusher blade being located above the foldable interior door when the foldable interior door is in a lowered position,
a set of debris pusher controls attached to the main compartment,
wherein the debris pusher blade is designed to move toward the rear end of the base and move any debris within the main compartment out of the main compartment.

11. A utility trailer according to claim 10 wherein the main compartment of the utility trailer further comprises
a front top door attached to the main compartment,
a rear top door attached to the main compartment,
a left top door attached to the main compartment,
a right top door attached to the main compartment,
wherein one or more top doors can be extended upward and outward to provide additional roof cover.

12. A utility trailer according to claim 11 wherein the utility trailer further comprises
a shoot opening,
wherein the shoot opening extends from the main compartment.

13. A utility trailer according to claim 12 wherein the utility trailer further comprises
a plurality of lengths of hose, wherein each length of hose is embedded within the main compartment, further wherein each length of hose is connected to at least one other length of hose, and
at least one external hose connection, wherein the external hose connection is connected to at least one length of hose.

14. A utility trailer comprising
a trailer unit, the trailer unit comprising a base, the base having two surfaces comprising an upper surface and a lower surface, the base also having two sides comprising a left side and a right side, the base also having ends comprising a front end and a rear end,
means for mounting the base, said means further comprising
a plurality of axles,
a plurality of wheels, wherein each axle is connected to two wheels,
wherein the base is mounted on each axle of the plurality of axles,
means for attaching the utility trailer to a vehicle, said means further comprising
a hitch and jack assembly,
wherein the hitch and jack assembly is attached to the front end of the base,
further wherein the hitch and jack assembly can be attached to a vehicle, a main compartment attached to the base, the main compartment further comprising
a rear door,
means for mounting the rear door, said means further comprising a pair of tracks comprising a first track and a second track,
wherein each of the tracks are located within the main compartment,
a handle attached to the rear door, and
a padlock attached to the rear door,
an aft compartment attached to the base, wherein the aft compartment is located closer to the front end of the base than the location of the main compartment, wherein the aft compartment further comprises
a roll-up door,
a handle attached to the roll-up door,
at least one hook located within the aft compartment, means for allowing an individual to more easily enter and leave the aft compartment, said means further comprising a pair of ramps comprising a first ramp and a second ramp,
  wherein each of the ramps are located within the base,
  wherein each of the ramps can be pulled out of the base when needed,
a wind deflector bubble, wherein the wind deflector bubble is located on the aft compartment,
a pair of telescoping rods comprising a first telescoping rod and a second telescoping rod, wherein each of the telescoping rods is attached to the main compartment,
a tarp roll attached to each of the telescoping rods of the pair of telescoping rods,
a tarp attached to the tarp roll, wherein the tarp can be pulled over the main compartment,
means for fastening the tarp to the main compartment, said means further comprising
  a plurality of tie downs,
    wherein each of the tie downs of the plurality of tie downs are attached to the main compartment,
a trash door attached to the main compartment,
an interior floor located within the main compartment,
a pullout debris tray located within the main compartment in between the interior floor and the upper surface of the base,
a pair of handles comprising a first handle and a second handle, wherein the pair of handles are attached to the pullout debris tray,
a conveyor system, the conveyor system further comprising
  a plurality of mounts located within the main compartment,
  a plurality of rollers, wherein each roller of the plurality of rollers is attached to each mount of the plurality of mounts,
  a conveyor belt, wherein the conveyor belt is attached to each of the rollers of the plurality of rollers,
  a conveyor drive attached to the conveyor belt, wherein the conveyor drive moves the belt in a direction toward the rear end of the main compartment, and
  means for controlling the conveyor drive, said means further comprising
    a pair of conveyor control boxes comprising a first conveyor control box and a second conveyor control box,
    wherein each of the conveyor control boxes is located on the main compartment,
means for moving debris out of the main compartment, said means further comprising
  a foldable interior door located within the main compartment,
  means for controlling the foldable interior door, said means further comprising a set of interior door controls, wherein the set of interior door controls is attached to the utility trailer,
  a debris pusher blade located within the main compartment, the debris pusher blade being located above the foldable interior door when the foldable interior door is in a lowered position,
  a set of debris pusher controls attached to the main compartment,
  wherein the debris pusher blade is designed to move toward the rear end of the base and move any debris within the main compartment out of the main compartment,
a front top door attached to the main compartment,
a rear top door attached to the main compartment,
a left top door attached to the main compartment,
a right top door attached to the main compartment,
a shoot opening, wherein the shoot opening extends from the main compartment,
a plurality of lengths of hose, wherein each length of hose is embedded within the main compartment, further wherein each length of hose is connected to at least one other length of hose, and
at least one external hose connection, wherein the external hose connection is connected to at least one length of hose.

* * * * *